Nov. 13, 1956  M. P. LAUGHLIN  2,770,085
POWER MOWER WITH FRUSTO-SPHERICAL GROUND SHOE
Filed Dec. 11, 1953  3 Sheets-Sheet 1
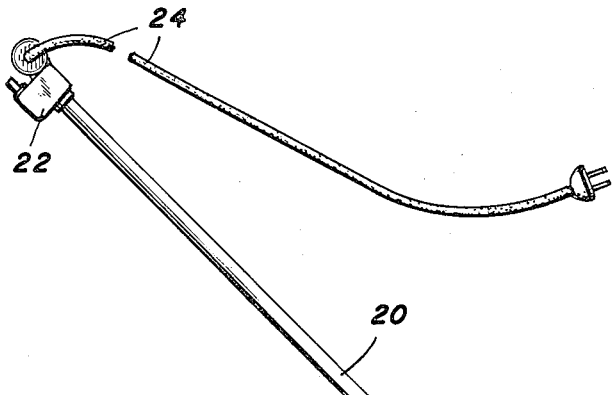
FIG. 1
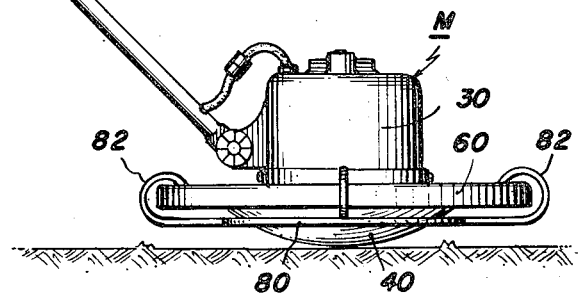
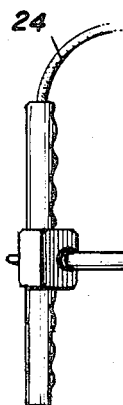
FIG. 2
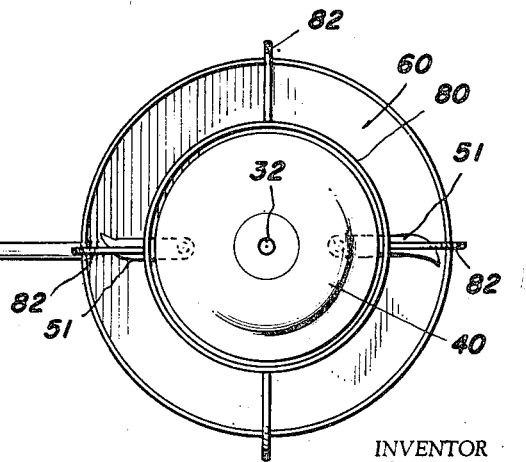
INVENTOR
Myron P. Laughlin

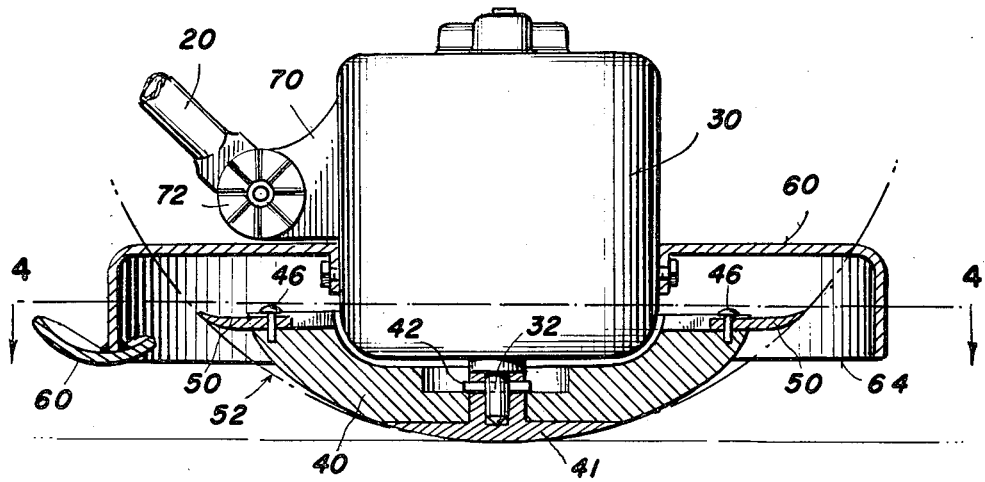
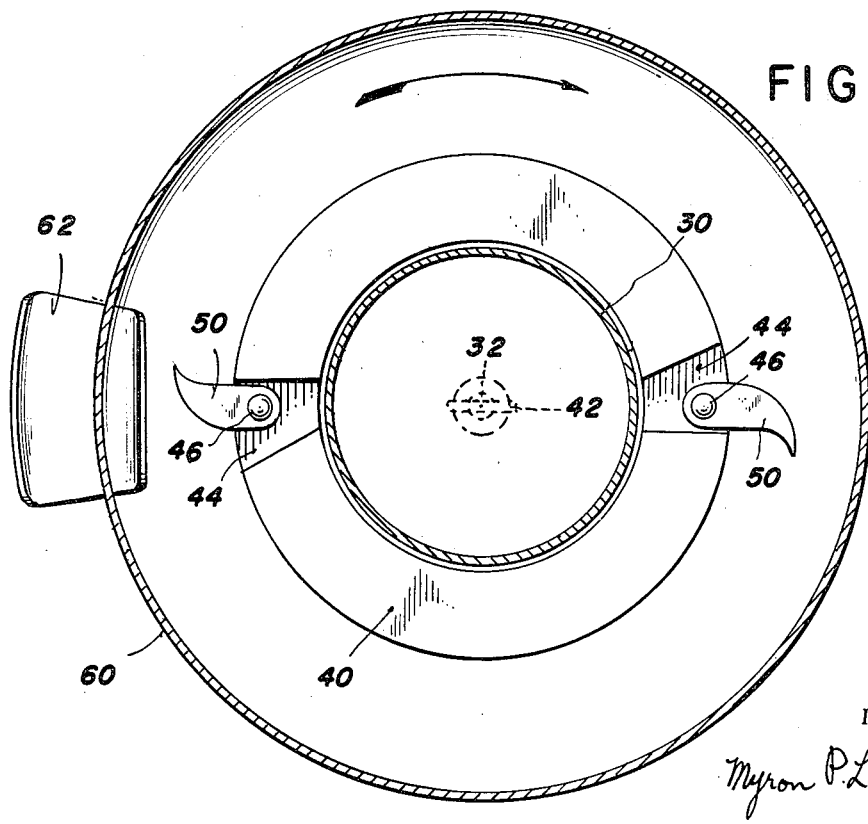

Nov. 13, 1956 M. P. LAUGHLIN 2,770,085
POWER MOWER WITH FRUSTO-SPHERICAL GROUND SHOE
Filed Dec. 11, 1953 3 Sheets-Sheet 3

INVENTOR
Myron P. Laughlin

United States Patent Office 2,770,085
Patented Nov. 13, 1956

2,770,085

POWER MOWER WITH FRUSTO-SPHERICAL GROUND SHOE

Myron P. Laughlin, St. Petersburg, Fla.

Application December 11, 1953, Serial No. 397,508

9 Claims. (Cl. 56—25.4)

This invention relates to lawnmowers and more particularly to improvements in lawnmowers of the self-driven type disclosed in my prior application Serial No. 314,647, filed October 14, 1952, of which the present application is a continuation-in-part. It is the primary purpose of this invention to provide a self-driven lawnmower which, by its extreme simplicity, will be so low in cost as to be used by every lawn owner.

It is the further purpose of this invention to provide a self-driven lawnmower which can propel itself in any direction relative to the operator's position.

A further more specific object of this invention is to provide a power lawnmower which is so constructed and arranged that its movement in a desired direction is effected by simple tilting movement applied either to the mower as a whole or to a rear ground-engaging component thereof.

Certain other improvements and advantages will appear as the appended description proceeds. In the descriptive matter:

Fig. 1 is a side elevation of a preferred modification.

Fig. 2 is a view looking directly upward from beneath the mower and shows the actuating mechanism.

Fig. 3 is an enlarged elevation in partial section of the lawnmower.

Fig. 4 is a view looking downward along line 4—4 of Fig. 3.

Figure 5:
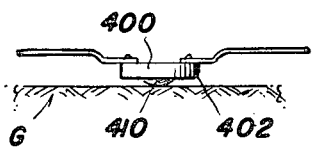
Figure 6:
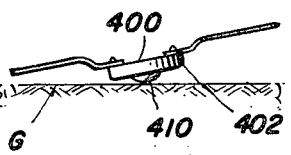
Figure 7:
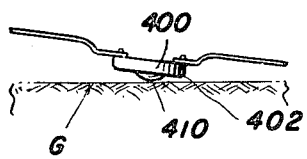

Figs. 5, 6 and 7 serve to show positions of a modified driving disc, the disc tilt in Figs. 6 and 7 being exaggerated to aid visualization.

Figure 8:
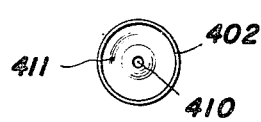

Fig. 8 is a bottom view of the modified disc of Figs. 5, 6, 7.

Figure 9:
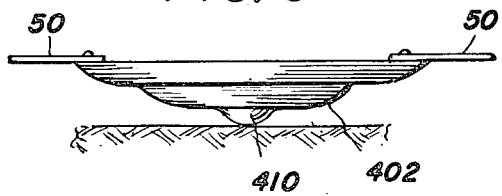
Figure 10:
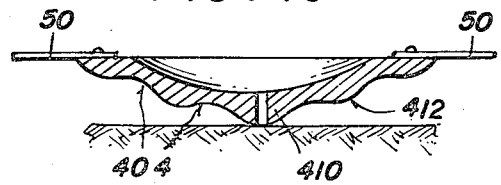

Figs. 9 and 10 are respectively side elevation and cross section of a modified form of driving disc.

Figure 11:
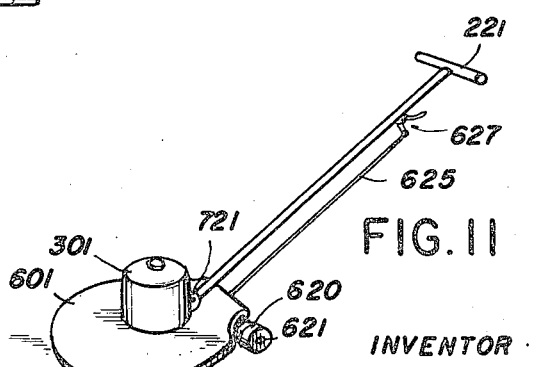

Fig. 11 is a perspective view of a further modification of the complete mower.

Figure 12:
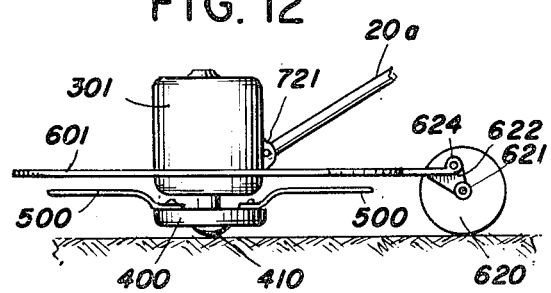

Fig. 12 is a slightly enlarged side elevation of the device in Fig. 11.

Figure 13:
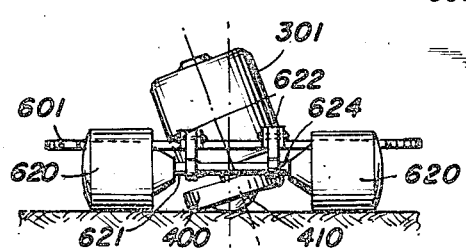

Fig. 13 is a rear elevation of the device shown in Fig. 11.

Figure 14:
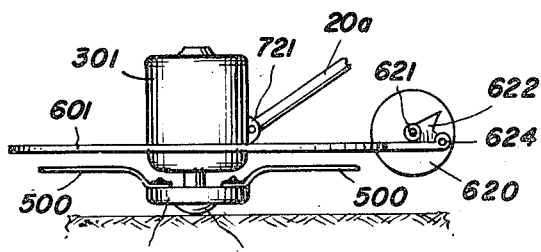

Fig. 14 shows the device of Figs. 11, 12 and 13 with the rollers thereof in raised position.

Referring to Figs. 1, 2 and 4, the mower M is provided with a suitable handle 20 having a control switch 22 from which projects electrical supply cord 24 which may be of any desired length as will be understood by those skilled in the art. It will be understood also that these electrical parts will be replaced by suitable controls well known to those skilled in the art and familiar with rotary lawnmower drives where a gasoline motor is employed and that electrical appliances are here shown merely for purposes of simplified description.

Mower M is here shown with a motor 30 whose shaft 32 projects below the body thereof after the usual fashion for vertical motors. Upon the end of shaft 32, I mount a generally frusto- or parti-spherical shoe or disc 40 (hereinafter sometimes referred to as a "disc") through such means as a sleeve ending in apex 41 and a shear pin 42. Shoe or disc 40 is provided with recesses 44 with studs 46 wherein and thereon are mounted cutter blades 50 preferably in such fashion that upon striking an obstruction in the lawn, they will be able to yield without breakage of the parts.

The above described few parts constitute the simplest form of my invention and its operation can be observed if the disc and motor rotor are considered as a spinning top which, in its vertical position, spins upon the apex piece 41 without motion, but which if tilted to either side provides a wheel of increasing diameter contacting the ground surface and propelling the disc and motor. In the structure which has been shown, the cutters 50 tilt with the disc, but are preferably curved upward to substantially the curve of the disc, as indicated by the broken line 52 in Fig. 3, so that the effective part of the cutter actually remains at substantially uniform height from the ground within usual mowing tolerances. A uniform cut is further maintained by mounting cutters 50 rather loosely upon studs 46 so that centrifugal force and gyroscopic action combine to establish the cutter body substantially parallel to the ground surface.

Protection of cutters 50 and mounting for motor 30 is obtained through a platform-like circular casing 60 through which the housing of said motor may project and be secured as illustratively shown in Fig. 3, the casing member and motor housing thus serving as housing means for the shoe or disc 40 and cutters 50 carried thereby. The motor housing may be provided with a bracket 70 to which attaches handle 20 through adjustable clamp 72. At the rear end of casing 60, I prefer to provide a shoe-type bumper 62 aiding and supplementing skirt 64 in stabilizing and protecting the whole rotary structure so that when the mower obtains a substantially high speed, it may be adequately checked on approach to rigid objects and be protected therefrom.

Referring now particularly to Figs. 1 and 2, a further protection for the cutters 50 will be found in a guard ring 80 mounted to the casing 60 through such means as brackets 82 so that it rides just below cutters 51 which are here elongated sufficiently to project beyond the ring and which are thereby protected from soft ground as is the disc 40 in that its penetration distance into such soft material is thus limited.

The action of the disc in driving the lawnmower is perhaps best understood by reference to Figs. 5, 6, 7 and 8 wherein a modified form of disc 400 is provided with an outer ring 402 and a central apex boss 410 having an annular depressed section therebetween (similar to the annular depressions designated 404, Fig. 10, to be described). Ring 402 and boss 410 are here shown as parts of the same shoe, but it being understood that such parts may be separately journalled and driven.

It will be noted in Fig. 5 that when vertical, the disc revolves upon the central apex boss 410 with minimum friction, but that when the housing means (motor and casing) is tilted slightly to the left, which results in the shoe or disc 400 being also tilted as in Fig. 6, ring 402 immediately contacts the ground G and the mower is propelled in one direction, while, if the motor be tilted to the right, as in Fig. 7, ring 402 again contacts the ground, but on the opposite side, and the mower is propelled in the opposite direction. It will be obvious that by manipulation of handle 20, the motor may be tilted to the right, to the left, forward or backward, as may be desired, and that the lawnmower will travel ahead, or reverse, to one side or to the other side, or, in fact, in any direction over the ground as desired.

It will also be seen on reference to Figs. 9 and 10 that the driving disc may be further modified through the addition of annular grooves 404 which define between them a ring 412 serving as or supplementing the action of the outer ring 402 (Figs. 5-8) which has been mentioned, the purpose of these grooves being to substantially reduce friction between disc and ground, as it has been found that the available drive is more than adequate to propel the mower at useful speeds with a tilt of 2 to 4 degrees from the vertical. It will also be clear that certain sections of the disc may be flexible and of varied frictional resistance for the purposes set forth.

Referring now particularly to the modified form shown in Figs. 11, 12, 13 and 14, handle 20a is here attached to the motor 301 through a suitable adjustable clamp 721 and may be provided with a finger control switch at 221 after substantially the fashion previously described. However, disc 400 is here preferably of small diameter and the cutter blades 500 made long with their attachment studs fitted loosely to allow the cutters to adjust themselves.

In this modification, shoe-bumper 62 (Figs. 3 and 4) is replaced by rolls 620 journalled upon a suitable cross shaft 621 in bracket 622, which latter is hinged at 624 to the protective casing 601 of the housing means. The position of bracket 622 is secured by and controlled through rod 625 by a suitable lever 627 mounted upon the handle 20a within reach of the operator and it will be seen that through lever 627 the operator can raise or lower the rolls 620, causing them to assume the position as shown in Fig. 12 in which they make ground contact or that shown in Fig. 14 in which they are raised to a retracted or inactive position. Thus, when the rolls 620 are in contact with the ground, the improved mower may be utilized as an ordinary "straight-ahead" mower or when the operator chooses, manipulation of lever 627 will permit the mower to operate from side to side before the operator. It will be understood that rolls 620 may be used in intermediate positions for partial stabilization of the mower and that, as in Fig. 13, motor 301 may be pre-adjusted i. e. tilted with respect to the casing 601 by a slight angle to the line vertical to the roller shaft 621 (and the ground) so that forward propulsion will be provided immediately when the operator lowers the disc 400 in the ground contact. It will also be clear that by shifting the spindle of certain present hand-pushed mowers and applying my propulsion disc thereto, such mowers may be made self-propelling.

The mechanism which has been described will be seen to eliminate all of the reduction gears, clutches, gearing, and the like heretofore thought necessary to the propulsion of a power-driven lawnmower, and it will be understood that the propelling speed the drive provides will involve only correct proportioning of the ground shoe or disc parts. Manifestly, while all of the heretofore employed reducing gears and power drives may be eliminated by this invention, the same may be employed in some instances in conjunction with this invention with beneficial results.

What I claim is:

1. A power mower comprising a portable housing means, a power-rotated shaft depending from and extending substantially normal to said housing means, a generally frusto-spherical ground shoe operatively connected to the shaft below said housing means and forming a ground support for said housing means, a plurality of cutting means extending radially outwardly from the peripheral portion of said shoe, and handle means operatively connected to said housing means for tilting the latter and thereby the shoe to cause movement of the mower in a desired direction.

2. A power mower substantially as set forth in claim 1, wherein said cutting means comprises cutting blades having a loose connection at their inner ends with the ground shoe and whose outer ends having curvature corresponding generally to that of the shoe whereby said cutter means tend to operate in a substantially horizontal plane with tilting of the mower.

3. A power mower substantially as set forth in claim 1, wherein said housing means comprises a protective casing member and the housing of a power means mounted on said member for powering said shaft, said casing member and power-means housing together housing the ground shoe and cutting means from above.

4. A power mower substantially as set forth in claim 3, wherein said handle means is connected to said power means-housing.

5. A power mower substantially as set forth in claim 1, wherein said housing means comprises a protective casing member and the housing of a power means mounted on said member for powering said shaft, and wherein said power means-housing is rigidly affixed to said casing member and said handle means is connected to said housing.

6. A power mower substantially as set forth in claim 1, wherein said housing means comprises a protective casing member and the housing of a power means operatively mounted on said casing member for powering said shaft, said power means and its housing being mounted for bodily tilting movement with respect to the casing member and said handle means being connected directly to said housing, the construction and arrangement being such that said power means, shaft and ground shoe may be tilted as a unit independently of said casing member.

7. A power mower substantially as set forth in claim 6, wherein said casing member is provided adjacent its rear end with a cross shaft mounting spaced rolls operative when in contact with the ground to cause the mower to move in straight-ahead direction, and means for actuating said cross shaft to move said rolls in contact with the ground.

8. A power mower substantially as set forth in claim 7, wherein said cross shaft is mounted for swinging movement from and to a normally inactive position in which said rollers are maintained out of contact with the ground to and from an active position in which they make ground contact.

9. A power mower substantially as set forth in claim 1, wherein said ground shoe is formed with a central boss portion, at least one annular depression encircling said boss portion, and an annular ring portion disposed outwardly of said depression and adapted to contact the ground when said ground shoe is tilted.

References Cited in the file of this patent

UNITED STATES PATENTS

| | | |
|---|---|---|
| 2,471,367 | Cavaness | May 24, 1949 |
| 2,549,317 | Laughlin | Apr. 17, 1951 |
| 2,564,201 | Hainke | Aug. 14, 1951 |
| 2,597,774 | Britten | May 20, 1952 |
| 2,603,301 | Sipior et al. | July 15, 1952 |
| 2,636,333 | Michaels | Apr. 28, 1953 |
| 2,669,826 | Watrous | Feb. 23, 1954 |
| 2,707,363 | Beranek et al. | May 3, 1955 |

FOREIGN PATENTS

| | | |
|---|---|---|
| 1,007,559 | France | Feb. 6, 1952 |